Aug. 19, 1924.
J. N. DERSCHUG
1,505,874
DRIVE MECHANISM FOR COMBINED WASHERS AND WRINGERS
Original Filed Jan. 31, 1920   5 Sheets-Sheet 1
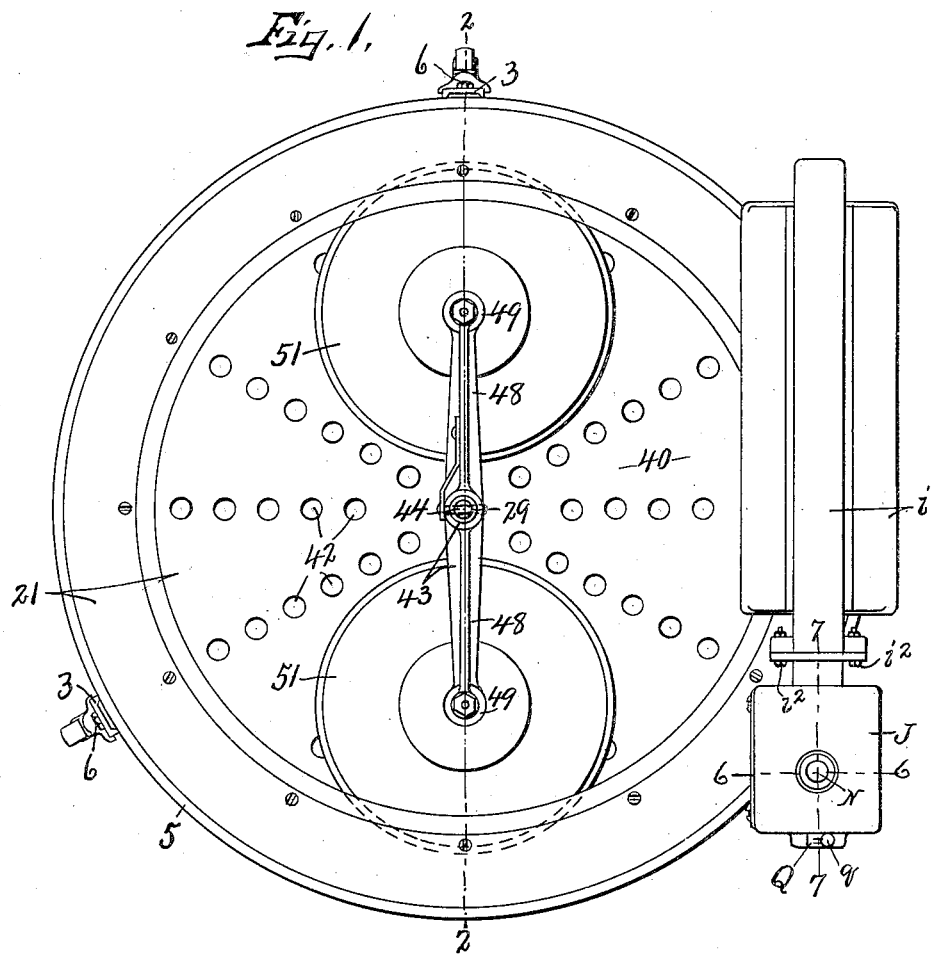

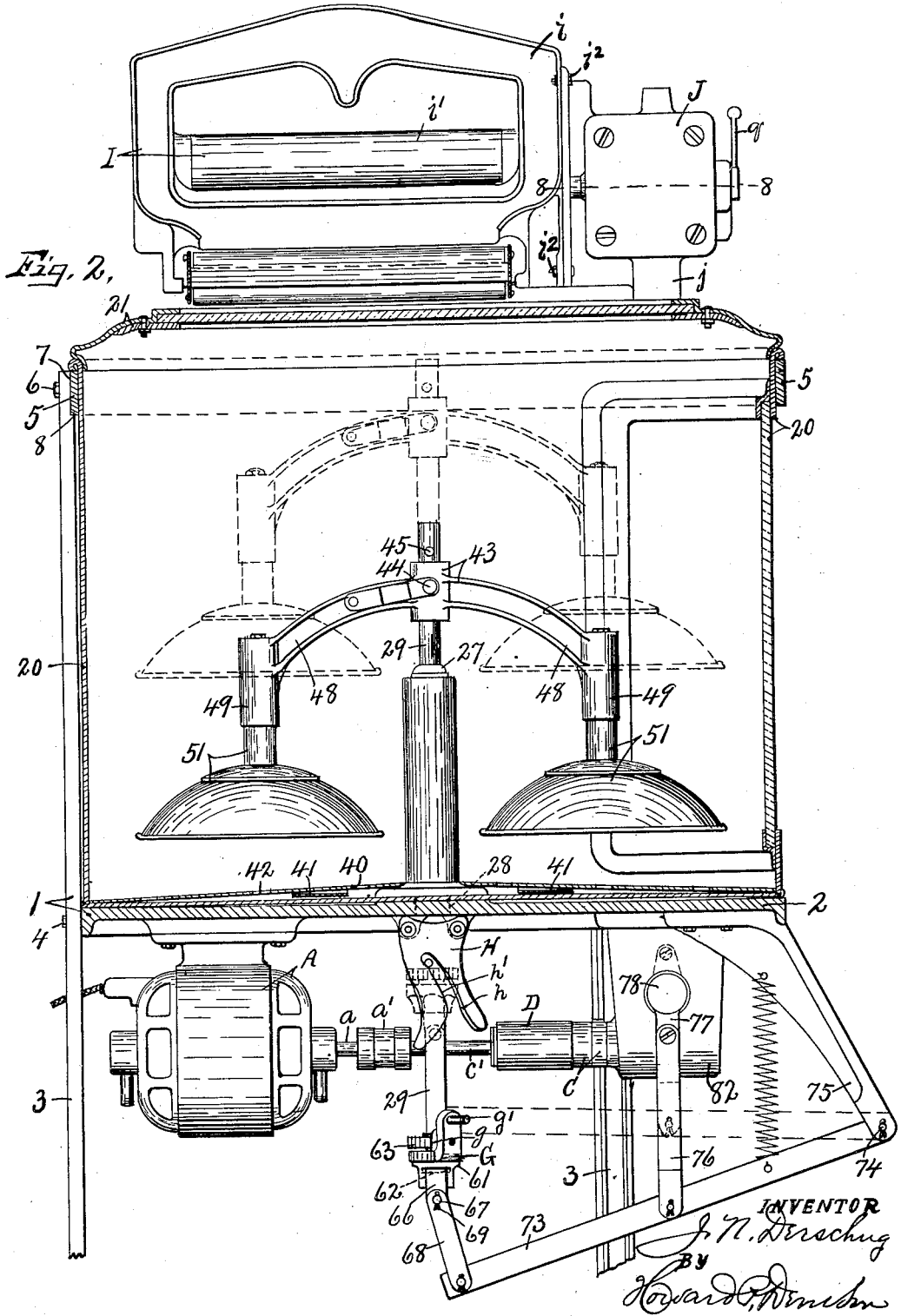

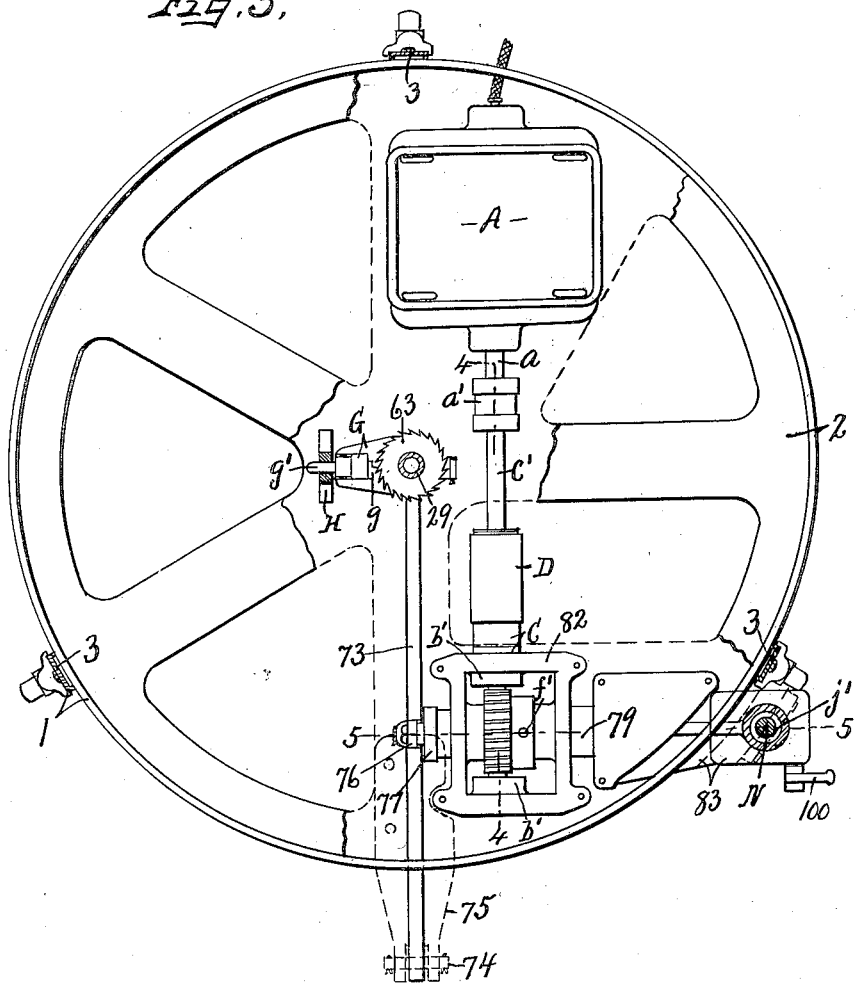

Aug. 19, 1924.
J. N. DERSCHUG
1,505,874
DRIVE MECHANISM FOR COMBINED WASHERS AND WRINGERS
Original Filed Jan. 31, 1920  5 Sheets-Sheet 4
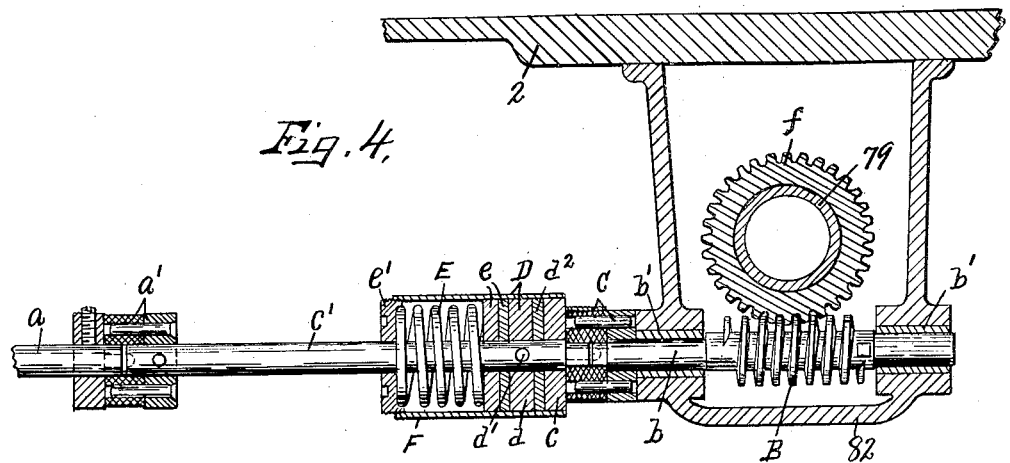
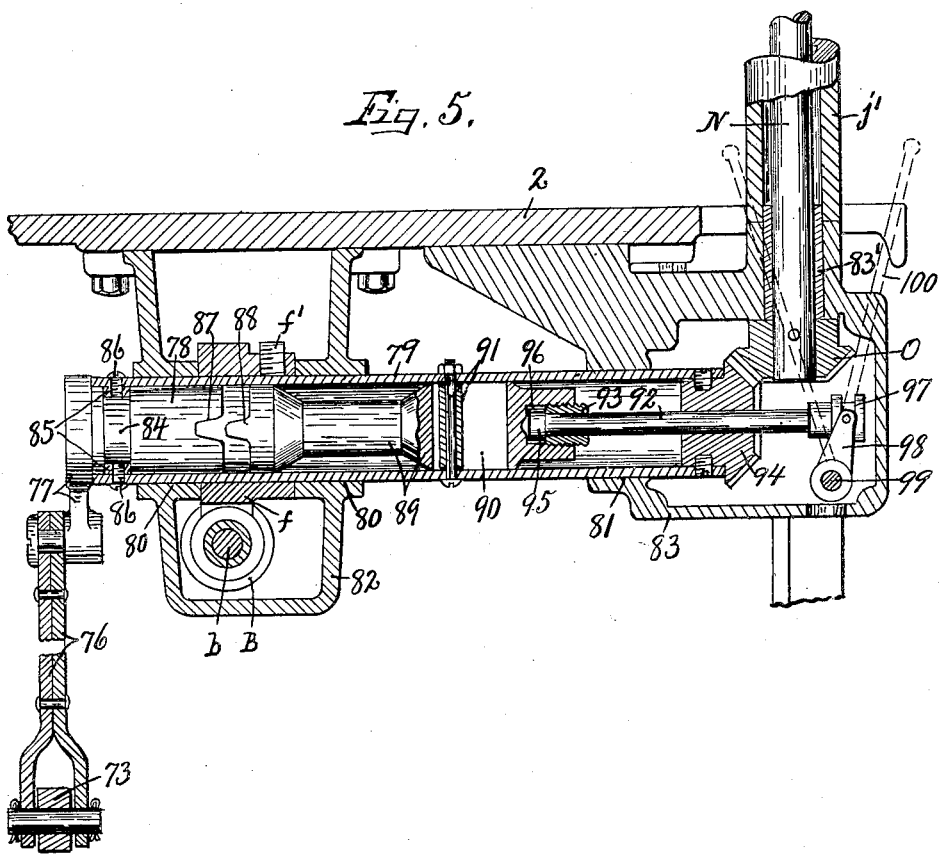

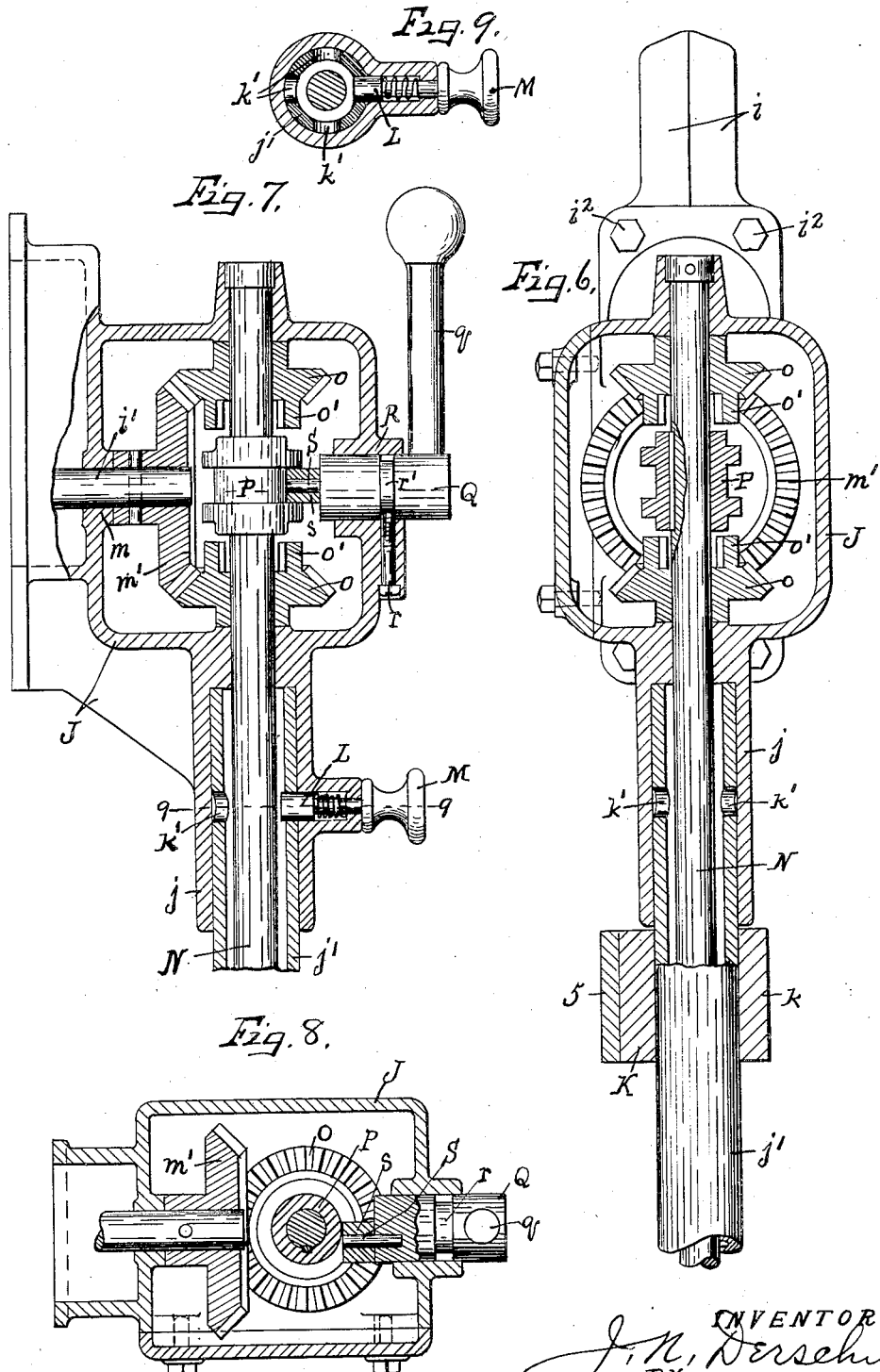

Patented Aug. 19, 1924.

1,505,874

UNITED STATES PATENT OFFICE.

JOHN N. DERSCHUG, OF SYRACUSE, NEW YORK, ASSIGNOR TO SYRACUSE WASHING MACHINE CORPORATION, OF SYRACUSE, NEW YORK, A CORPORATION OF NEW YORK.

DRIVE MECHANISM FOR COMBINED WASHERS AND WRINGERS.

Original application filed January 31, 1920, Serial No. 355,515. Divided and this application filed October 25, 1921. Serial No. 510,297.

*To all whom it may concern:*

Be it known that I, JOHN N. DERSCHUG, a citizen of the United States, and a resident of Syracuse, in the county of Onondaga, in the State of New York, have invented new and useful Improvements in Drive Mechanism for Combined Washers and Wringers, of which the following, taken in connection with the accompanying drawings, is a full, clear, and exact description.

This invention relates to mechanism for operating the movable parts of a combined washer and wringer as set forth in my pending application Sr. #355,515 filed January 31, 1920, of which the present application is a division.

The main object is to provide a more dependable, safe and even distribution of power from the motor to the working parts of the washer and wringer without overloading the motor or overstraining any of the power transmitting parts, and also to conserve the power and time required for various washing and drying operations in the same machine.

Another object is to support the wringer near one of the legs of the tripod in such manner that it may be swung to different positions over and away from the top of the vat without liability of overturning the machine and thereby to avoid the use of extra means of support for this purpose.

A further object is to assemble the various mechanisms upon the machine in such manner as to avoid excessive vibration thereof when in operation.

Other objects and uses relating to other specific parts of the machine will be brought out in the following description:

In the drawings:

Fig. 1 is a top plan of a clothes washing machine embodying the various features of my invention.

Fig. 2 is a transverse vertical sectional view of the same machine taken on line 2—2, Fig. 1.

Fig. 3 is a top plan of the mechanism underlying the vat, a portion of the supporting bed therefor being broken away.

Fig. 4 is an enlarged vertical sectional view taken on line 4—4, Fig. 3, showing means for transmitting motion from the motor shaft to the horizontal countershaft from which power is transmitted to the dashers and to the wringer.

Fig. 5 is an enlarged sectional view taken on line 5—5, Fig. 3.

Figs. 6 and 7 are enlarged vertical sectional views taken respectively, on lines 6—6 and 7—7, Fig. 1.

Fig. 8 is an enlarged horizontal sectional view taken on line 8—8, Fig. 2.

Fig. 9 is a horizontal sectional view taken in the plane of line 9—9, Fig. 7.

The machine, as illustrated, comprises a main supporting frame —1— having a circular platform —2— disposed in a substantially horizontal plane and supported by a series of, in this instance three, upright legs —3— in uniformly spaced relation circumferentially, said legs being extended above and below the plane of the platform —2— and are secured to said platform by bolts —4—.

A circular band or ring —5— is secured by bolts —6— to the legs —3— to assist in holding the legs in fixed relation to each other and to said platform, said legs being preferably made of channel irons for imparting additional rigidity and strength thereto.

The upper ends of the legs —3— are recessed at —7— to form shoulders —8— which are engaged by the ring or band —5— to further stiffen the frame and legs.

A circular vat —20— is supported upon the platform —2— within the legs —3— and ring or band —5— so that it may be readily removed by upward displacement and is provided with a lid or cover —21— loosely resting upon its upper edge.

A tubular post —27— is secured at its lower end in registering openings —28— to the center of the platform —2— and the bottom of the vat —20— and rises above the bottom for receiving and guiding a vertically movable plunger —29—.

A perforated sheet metal plate —40— of substantially the same diameter as that of the interior of the vat is supported in said vat a short distance above the bottom thereof by means of suitable feet or projections —41— and is provided with perforations —42—.

The object of this perforated plate is to allow the water to pass therethrough from the bottom upward and also from the top downward, which permits the clothes to be more thoroughly washed by the vertical reciprocatory dashers by reason of the fact that the water is free to pass entirely through the clothes in reverse directions.

The plunger —29— is tubular and extends entirely through and beyond the ends of the post —27—.

A yoke —43— is adjustably mounted upon the upper end of the plunger —29— and is held in its adjusted position by a removable locking bolt —44— which is adapted to enter one of a series of openings —45— in the plunger for supporting the dashers at different heights.

This yoke is provided with opposite downwardly curved arms —48— which are of substantially equal length and are provided at their outer ends with tubular heads —49— open at the bottom for receiving and supporting a pair of dashers —51—.

*Plunger reciprocating mechanism.*

A collar —61— is loosely mounted upon the lower end of the plunger —29— and is held against endwise movement relative to said plunger by means of a washer —62— and a ratchet wheel —63—, both of which are secured to the plunger.

This collar is provided with apertured lugs —66— for receiving a pivotal pin —67— which projects beyond the outer faces of the lugs for supporting a pair of links —68—, the latter being held in place by cotter pins —69— and are connected at their lower ends to one end of a vertically movable rocking lever —73— having its opposite end pivoted at —74— to a bracket —75— on the under side of the platform, said lever being connected by a pitman —76— to a crank arm —77— on one end of a rotary shaft section —78—.

This shaft section —78— is loosely journaled in one end of a tubular countershaft —79— which is journaled in bearings —80— and —81— forming parts of separate gear cases —82— and —83— both of which are secured to the platform —2— as shown in Fig. 5, said shaft section —78— being provided with an annular groove —84— for receiving a pair of diametrically opposite retainers —85— which are secured by screws —86— to the adjacent sides of the sleeve or countershaft —79— to hold the shaft section —78— against endwise movement relatively to said countershaft.

The inner end of the shaft section —78— is provided with a clutch face —87— cooperating with a companion clutch face —88— on the adjacent end of a clutch section —89— within the sleeve —79—, the intermediate portion of said clutch section —89— being provided with a diametrical slot —90— therethrough for receiving a key or pin —91— which is secured to the opposite walls of the sleeve —79— to transmit rotary motion from said sleeve to the clutch section —89— and to allow the clutch section to be moved axially within the sleeve for engaging and disengaging its clutch face —88— with and from the companion clutch face —87—.

A spindle —92— coaxial with the sleeve —79— is loosely journaled at one end in a bushing —93— in the outer end of the clutch section —88— and extends outwardly through a gear —94— on the outer end of the sleeve —79—, the inner end of the spindle being provided with a head —95— interposed between the inner end of the bushing and end wall of a socket —96— in which the head is rotatable to hold the clutch section and spindle against relative endwise movement and at the same time permitting relative rotation of the clutch section and spindle.

The outer end of the spindle —92— is provided with a grooved collar —97— for engagement by a shifting arm —98— which is secured to a rock shaft —99— in the gear case —83—, one end of said rock shaft being extended through a suitable opening in the gear case and is secured to a hand lever —100— by which the shifting member —98— may be rocked in reverse directions for throwing the clutch section —89— into and out of engagement with the shaft section —78— to start and stop the reciprocation of the plunger —29— and dashers —51— carried thereby.

The means for transmitting motion to the counter-shaft or sleeve —79— comprises an electric motor —A— having its frame secured to the platform —2— and its motor shaft as —a— disposed horizontally at right angles to the axis of the countershaft —79— as shown more clearly in Fig. 3, said motor shaft being preferably made in sections coupled together by a universal joint —a'— to compensate for any slight variations in the alignment of the shaft sections.

A worm —B— is secured to a motor shaft section —b— which is journaled in bearings —b'— in the gear case —82— and is connected by a universal coupling —C— to a loose disc or collar —c— on the adjacent end of a coaxial motor shaft section —c'—.

The disc —c— which is loose on the shaft section —c'— is connected by a friction clutch —D— to the shaft section —c'— to prevent stalling of the motor, said clutch comprising a disc —d— secured by a pin —d'— in spaced relation to the disc —c— to receive between them a fibre disc —$d^2$—.

Additional discs —e— are loosely mounted upon the shaft section —c'— between the disc —d— and adjacent end of a coil spring —E— which surrounds the shaft section —c'— and has its outer end abutting against an adjusting screw or nut —e'— which is loose on the shaft section —c'— and is screwed into the adjacent end of an enclosing sleeve —F— to adjust the tension of the spring and thereby regulate the friction between the several discs, the inner end of the sleeve —F— being rigidly secured to the disc —c—.

The worm —B— meshes with a worm gear —f— which is secured by a set screw —f'— to the periphery of the counter-shaft —79— as shown in Fig. 5, and serves to hold the counter-shaft —79— against endwise movement.

When the motor is in operation and the clutch section —89— is engaged with the clutch face —87—, reciprocatory motion will be transmitted to the plunger —29— through the medium of the pitman —76—, lever —73—, link —68— and collar —61— for operating the dashers —51—.

*Intermittent rotary motion.*

The ratchet wheel —63— is secured to the lower end of the plunger directly above the collar —61— which has its upper end reduced in diameter to form a journal bearing for a horizontal rocking member —G— carrying a pawl —g— and a radial pin —g'—, the pawl —g— being spring pressed radially into engagement with the teeth of the ratchet wheel —63— to rotate the plunger one or more tooth spaces at a time when the lever —G— is rocked in one direction and to permit said pawl to return freely across the face of the teeth.

A plate —H— is secured to the underside of the bed plate or platform —2— and extends downwardly therefrom, said plate being provided with a diagonal slot having its opposite walls forming cams —h— and —h'—, the lower end of the slot being open and disposed in the path of the vertically movable pin —g'— to receive said pin as the plunger approaches the limit of its upward movement and to permit it to ride against the cam face —h— for rocking the member —C— and pawl carried thereby and rotating the plunger with the dashers thereon through a limited arc as the pin continues its upward movement along the cam face —h—, the opposite cam face —h'— serving to return the rocking member —G— to its starting position as the plunger is moved downwardly.

The lower end of the slot in the plate —H— is flared circumferentially to assure the entrance of the pin —g'— into said slot when the plunger is elevated.

*Wringer driving mechanism.*

The washing machine is equipped with a suitable wringer —I— adapted to be moved to and from a position across the upper end of the vat —20— and comprises a frame —i— and a pair of rollers —i'— which are adapted to be rotated in reverse direction for feeding the clothes into and out of the vat.

The wringer frame —i— is provided at one end with a gear case —J— having a hub —j— mounted upon the upper end of a stationary supporting post —j'—, as shown in Figs. 6 and 7, the lower end of said post being removably mounted on a tubular hub —83'— of the gear case —83—.

The wringer frame is preferably made in sections, one section carrying the rollers —i'— while the other section is removably mounted upon the upper end of the post —j—, the sections of the wringer being secured together end to end by bolts —i²—.

The upper portion of the post —j'— just below the hub —j— may be attached to the circular band —5— or adjacent leg —3— by means of a bracket —K—, which together with the bearing at the lower end of the post serves to hold it rigidly in an upright position, it being held against rotation by any suitable means, as, for example, a clamping plate —k— on the bracket —K—.

The portion of the post —j'— within the hub —j— is provided with a series of, in this instance four, radial apertures —k'— arranged equal distances apart circumferentially for receiving a locking bolt —L— which is slidable radially in a socket and in one side of the hub —j— and is spring pressed inwardly into the aperture —k'— which may register therewith to hold the wringer in its adjusted position, the outer end of the pawl or bolt —L— being provided with a handle or knob —M— by which it may be withdrawn outwardly against the action of its retracting spring to release the wringer frame and to allow it to be turned horizontally about the axis of the post —j'— to and from a position above one side of the tub or vat —20—.

The supporting shaft for the lower wringer roll —i'— is extended axially and journaled in a suitable bearing —m— in the wringer frame or in one side of the gear case —J— and is provided with a gear —m'— secured thereto within said gear case.

A vertical shaft —N— extends centrally through and beyond the opposite ends of the upright post —j'— and has its lower end journaled in a bearing —83'— in the gear case —83— and its upper end in the gear case —J—, the lower end of said shaft being provided with a gear —O— meshing with the gear —94— on the countershaft —79—.

A pair of beveled gears —o— are loosely mounted upon the upper end of the shaft —N— within the gear case —J— and are normally engaged with the lower and upper faces of the gear —m'—.

The inner ends of the beveled gears —o— are provided with clutch faces —o'— adapted to be engaged by corresponding clutch faces on the ends of an interposed clutch collar —P— which is splined upon the shaft —N— to rotate therewith and to move endwise into and out of engagement the clutch faces —o'—.

A rock shaft —Q— is journaled in a suitable bearing —R— on the outer end of the gear case —J— and is held against endwise movement by an adjusting screw —r— which is engaged in a radial threaded aperture in the bearing —B— and enters an annular groove —r'—. The rock shaft —Q— is provided with an eccentric pin —S— carrying the roller —s— which rides in the annular groove in the collar —P— to adjust said collar axially into and out of engagement with one or the other of the gears —o— according to the direction in which it is desired to rotate the wringer-rolls, said rock shaft being provided with a hand piece —q— by which it may be operated.

Operation.

The operation briefly described is as follows: Assuming that the motor is in operation, power may be transmitted to the plunger for reciprocating the dashers —51— vertically by simply throwing the clutch —88— to locking engagement with the companion clutch —87— by means of the hand lever —100—.

This operation may be effected without operating the wringer mechanism, which on the other hand may be operated in either direction independently of the plunger by simply shifting the clutch member —P— in one direction or the other according to the direction in which it is desired to rotate the wringer-rolls, in which case the clutch —88— would be withdrawn from engagement with its companion clutch —87—.

Or, if desired, both the plunger and the wringer mechanism may be brought into action simultaneously by the proper adjustment of both of the clutches —88— and —P—.

What I claim is:

1. In a machine of the character described, two parallel upright shafts, a tubular horizontal shaft, means for rotating the tubular shaft, a clutch section loosely journaled in the tubular shaft to allow said tubular shaft to rotate independently thereof, means movable within said tubular shaft for causing the clutch section to rotate therewith, means driven by the tubular shaft for rotating one of the upright shafts, and means driven by the clutch section when driven by the tubular shaft for reciprocating the other upright shaft endwise.

2. In a machine of the character described, the combination with parallel upright shafts, a tubular countershaft and a motor, of means including a friction clutch driven by the motor for rotating the counter-shaft, means driven by the counter-shaft for rotating one of the upright shafts, and means including a clutch section slidable within the counter-shaft and rotated thereby for reciprocating the other upright shaft endwise.

3. In a machine of the character described, the combination of parallel upright shafts, a horizontal tubular counter-shaft, a worm gear tight on the counter-shaft, a worm engaging said gear for driving the same, an electric motor, driving connections between the armature shaft of the motor and worm including a friction clutch, means driven by the counter-shaft for rotating one of the upright shafts, and means driven by the counter-shaft for reciprocating the other upright shaft and including a clutch within the tubular shaft for stopping and starting the last named shaft independently of the first named shaft.

4. In a machine of the character described, the combination of two parallel upright shafts, a horizontal tubular driving shaft, gear connections between the driving shaft and counter-shaft for rotating said counter-shaft, gear connections between the counter-shaft and one of the upright shafts for rotating said upright shaft, means driven by the counter-shaft for reciprocating the other upright shaft and including a clutch within the tubular shaft for stopping and starting the second named upright shaft independently of the first named upright shaft, a gear housing rotatable about the axis of the revoluble upright shaft, a wringer-roll journaled in the gear case to move therewith about the axis of the revoluble upright shaft and having an independent motion about its own axis and gears within said case for transmitting motion from the revoluble upright shaft to the wringer-roll.

5. In a machine of the character described, the combination of two parallel upright shafts, a horizontal tubular counter-shaft, a horizontal driving shaft, means including a friction clutch for transmitting motion from the driving shaft to the counter-shaft, means including a clutch within the tubular shaft and driven by the counter-shaft for reciprocating one of the upright shafts vertically, means driven by the counter-shaft for rotating the other upright shaft, a wringer support adjustable rotarily about the axis of the revoluble upright shaft, means for holding said support in different positions of angular adjustment, a wringer mounted on the support to move therewith about the axis of the revoluble upright shaft, and means for transmitting motion from said revoluble upright shaft to one of the wringer-rolls.

6. In a machine of the character described, two parallel upright shafts, a horizontal tubular counter-shaft, a horizontal driving shaft, means including a friction clutch for transmitting rotary motion from the driving shaft to the counter-shaft, a clutch section loosely mounted within the counter-shaft to permit the latter to rotate independently thereof, means movable lengthwise of and within the counter-shaft for imparting rotary motion to said clutch section, means actuated by the clutch section for reciprocating one of the upright shafts, means for transmitting rotary motion from the counter-shaft to the other upright shaft, a housing adjustable rotarily about the axis of the revoluble upright shaft, a wringer shaft journaled in the housing and reversing gearing within the housing for transmitting rotary motion to the wringer shaft in reverse directions.

7. A clothes washing machine as in claim 1 in which the vat-supporting frame and lower end of the reciprocating upright shaft are provided with cooperative means for turning said reciprocating upright shaft about its axis as it approaches the limit of its upward movement.

In witness whereof I have hereunto set my hand this 17th day of October, 1921.

JOHN N. DERSCHUG.

Witnesses:
H. E. CHASE,
M. R. COOKE.